(12) United States Patent  (10) Patent No.: US 8,756,300 B2
Lee  (45) Date of Patent: *Jun. 17, 2014

(54) TERMINAL PROVIDED WITH NETWORKING MODULE AND METHOD FOR RECEIVING AND TRANSMITTING DATA USING THE SAME

(75) Inventor: Se-Jin Lee, Yongin-si (KR)

(73) Assignee: LG Electronics Inc., Seoul (KR)

( * ) Notice: Subject to any disclaimer, the term of this patent is extended or adjusted under 35 U.S.C. 154(b) by 441 days.

This patent is subject to a terminal disclaimer.

(21) Appl. No.: 13/112,607

(22) Filed: May 20, 2011

(65) Prior Publication Data

US 2011/0219306 A1   Sep. 8, 2011

Related U.S. Application Data

(63) Continuation of application No. 12/343,179, filed on Dec. 23, 2008.

(30) Foreign Application Priority Data

Dec. 24, 2007 (KR) .................. 10-2007-0136752

(51) Int. Cl.
    *G06F 15/16*    (2006.01)
(52) U.S. Cl.
    USPC .......... 709/222; 709/223; 455/90.2; 455/90.3
(58) Field of Classification Search
    USPC ...................................................... 709/222
    See application file for complete search history.

(56) References Cited

U.S. PATENT DOCUMENTS

| 6,370,603 | B1  |   | 4/2002  | Silverman et al. |
|-----------|-----|---|---------|------------------|
| 6,763,226 | B1  | * | 7/2004  | McZeal, Jr. ................. 455/90.2 |
| 7,224,962 | B1  |   | 5/2007  | Kite |
| 7,587,508 | B2  |   | 9/2009  | van Oldenborgh et al. |
| 7,912,458 | B2  |   | 3/2011  | Ramer et al. |
| 2003/0153353 | A1 | * | 8/2003  | Cupps et al. ................. 455/556 |
| 2004/0109062 | A1 |   | 6/2004  | Yamaya |
| 2004/0230708 | A1 |   | 11/2004 | Juan |
| 2004/0233930 | A1 |   | 11/2004 | Colby, Jr. |
| 2005/0108314 | A1 |   | 5/2005  | Autio et al. |
| 2005/0228979 | A1 |   | 10/2005 | Senta et al. |
| 2006/0063544 | A1 | * | 3/2006  | Zhao et al. ................. 455/510 |

(Continued)

FOREIGN PATENT DOCUMENTS

| CN | 1380603 A          | 11/2002 |
|----|--------------------|---------|
| KR | 10-2003-0009514 A  | 1/2003  |
| KR | 10-2004-0098490 A  | 11/2004 |

*Primary Examiner* — Tauqir Hussain

(74) *Attorney, Agent, or Firm* — Birch, Stewart, Kolasch & Birch, LLP

(57) ABSTRACT

According to an embodiment of the present invention, a method for receiving data includes receiving, via a communication unit of a terminal, at least one of displayable data and soundable data from an external device, wherein the external device includes at least one of a touch-sensitive unit, a first displaying unit and a first speaker, wherein the communication unit connects to the Internet and includes at least one of a cabled communication unit and a wireless communication unit, and wherein the displayable data is displayed on the first displaying unit of the external device, and the soundable data is outputted through the first speaker of the external device, and outputting signals associated with the received at least one of displayable data and soundable data to a connectable output unit, wherein the connectable output unit includes at least one of a second speaker and a second displaying unit.

16 Claims, 5 Drawing Sheets

(56) References Cited

U.S. PATENT DOCUMENTS

| | | |
|---|---|---|
| 2006/0073795 A1* | 4/2006 | Mayblum et al. ............. 455/90.2 |
| 2006/0220071 A1 | 10/2006 | Sivalingham et al. |
| 2006/0258391 A1* | 11/2006 | Lee ............................ 455/550.1 |
| 2007/0035616 A1* | 2/2007 | Lee et al. ..................... 348/14.16 |
| 2007/0049358 A1* | 3/2007 | Kang et al. .................. 455/575.1 |
| 2007/0057866 A1* | 3/2007 | Lee et al. ........................ 345/1.1 |
| 2008/0146278 A1 | 6/2008 | Rofougaran |
| 2008/0201751 A1 | 8/2008 | Ahmed et al. |
| 2009/0061678 A1 | 3/2009 | Minoo et al. |
| 2011/0282799 A1 | 11/2011 | Huston |

* cited by examiner

TERMINAL PROVIDED WITH NETWORKING MODULE AND METHOD FOR RECEIVING AND TRANSMITTING DATA USING THE SAME

CROSS REFERENCE TO RELATED APPLICATIONS

This application is a Continuation of co-pending application Ser. No. 12/343,179 filed on Dec. 23, 2008, which claims priority to Korean Patent Application No. 10-2007-0136752 filed on Dec. 24, 2007. The entire contents of all of the above applications are hereby incorporated by reference.

BACKGROUND OF THE INVENTION

1. Field of the Invention

The present invention relates to a terminal provided with a networking module for sharing data with a counter terminal connected to the terminal and a method for receiving and transmitting data between two terminals using the same.

2. Description of the Related Art

Recently personal computers are spread broadly and the number of users which have both desktop computers and laptop computers or which have more than one personal computer is being increased. Accordingly, the need to move data from a computer to another computer is growing.

In order to move data from a computer to another computer, users usually move desired data from a computer to an external storage device, and then move the data one more time from the external storage device to another computer.

In another way, users use a separate adapting device connected between two computers in order to move data between two computers.

SUMMARY OF THE INVENTION

It is an object of the present invention to provide a terminal and a method being able to connect two terminals and to move data between the two terminals without separate storage devices or adapting devices.

It is another object of the present invention to provide a terminal and a method being able to connect two terminals directly and to move data between the two terminals in which the process for moving data is simplified so that users can move data conveniently.

To achieve these and other advantages and in accordance with the object of the present invention, as embodied and broadly described herein, the present invention provides in one aspect a terminal comprising a connection port configured to connect the terminal to a counter terminal, a networking module configured to receive and transmit data through the connection port connected with the counter terminal, and a control unit configured to command the networking module to receive and transmit data by running an interfacing program.

Here, the networking module may comprise a controller configured to control data reception and transmission between the terminal and the counter terminal, and a storage unit configured to store the interfacing program and a device driver for the networking module.

In this case, the networking module may be activated by power supplied through the connection port from the counter terminal.

The networking module may be configured to install the interfacing program and the device driver for the networking module on both the terminal and the counter terminal.

In addition, the interfacing program may be run by detecting a connection between the terminal and the counter terminal.

Further, the interfacing program may provide a user interface which allows users to set storage areas of the terminal, storage areas of the counter terminal and transmitting directions to receive or transmit data, and receives or transmits data from or to the counter terminal according to user settings set by the user interface.

Moreover the interfacing program may include an uninstall program for uninstalling the interfacing program and the device driver for the networking module on the counter terminal, if disconnection between the terminal and the counter terminal is detected.

In another aspect, the present invention provides a method for receiving and transmitting data in a network in which at least two terminals connected to each other receive and transmit data, the method comprising, (A) connecting a terminal provided with a networking module to a counter terminal through the networking module, (B) activating the networking module provided in the terminal, (C) running an interfacing program on the terminal and the counter terminal, and (D) receiving or transmitting data between the terminal and the counter terminal according to the interfacing program.

Here, the step (B) may comprise (B1) providing driving power to the networking module, and (B2) installing a device driver for the networking module on the terminal and the counter terminal.

The method may further comprise (E) installing the interfacing program on the terminal and the counter terminal, if the networking module is activated in the step (B).

Here, the step (B1) may be conducted by turning on an internal power switch connected to the networking module by power provided from the counter terminal.

Also, the step (E) is automatically conducted at the same time with activating the networking module.

In addition, the method may further comprise (F) setting at least one of storage areas of the terminal, storage areas of the counter terminal and transmitting directions to receive or transmit data through the interfacing program.

Furthermore, the method may further comprise (G) detecting disconnection between the terminal and the counter terminal, and (H) uninstalling at least one of the device driver for the networking module and the interfacing program installed in the step (B2) or the step (E), if the disconnection is detected.

Moreover, the step (F) may comprise (F1) selecting storage areas to receive or transmit data in each of the terminal and the counter terminal, (F2) displaying storage areas of each of the terminal and the counter terminal, selected in step (F1) on each other, and (F3) selecting a storage area from displayed storage areas in each of the terminal and the counter terminal.

The step (F1) may further comprise a step of setting data receiving or transmitting level of the selected storage area.

Besides, the step (F1) may further comprise a step of certify an authority to allow data receiving or transmitting from or to the selected storage area.

Meanwhile, the method may further comprise (I) changing Internet-sharing environment of each operating system of the terminal and the counter terminal according to predetermined criteria, if the networking module is activated, and (J) connecting the terminal to the Internet according to the Internet-sharing environment changed in the step (I).

Here, the method may further comprise (K) changing back the Internet-sharing environment of each operating system of the terminal and the counter terminal, changed in step (I), if disconnection between the terminal and the counter terminal is detected.

Moreover, the method may further comprise (L) blocking power supply to the terminal and the counter terminal by means of operating systems of the terminal and the counter terminal if connection between the terminal and the counter terminal is detected in the step (A).

Also, the method may further comprise (M) resuming the terminal or the counter terminal from a power saving mode if the terminal or the counter terminal is in the power saving state when the terminal is connected to the counter terminal in the step (A).

Here, the method may further comprise (N) allowing to transmit data inputted by an input device of one of the terminal and the counter terminal to the other, and (O) transmitting data inputted by the input device of one of the terminal and the counter terminal to the other.

The method may further comprise (P) setting an input device of the terminal as an input device for the counter terminal, (Q) transmitting data inputted by the input device set as an input device for the counter terminal to the counter terminal, (R) cancelling the setting in the counter terminal, and (S) processing the data inputted by the input device and transmitted to the counter terminal.

Further, the method may comprise (N') allowing to display output data generated in one of the terminal and the counter terminal on a display device of the other, and (O') transmitting output data generated in one of the terminal and the counter terminal to the other.

The method may further comprise (P') setting to display output data generated in the counter terminal on a display device of the terminal in the terminal, (Q') transmitting the output data to the terminal, (R') cancelling the setting in the counter terminal, and (S') displaying output data generated in the terminal on the display device of the terminal.

As described above in detail, in the terminal provided with a networking module and a method for receiving and transmitting data, the following advantages can be expected.

That is, it is advantageous in that users can move data between two terminals without any external storage devices or adaptors.

Furthermore, in the terminal provided with a networking module and a method for receiving and transmitting data, it is advantageous in that users can move data conveniently.

According to an embodiment of the present invention, a method for receiving data includes receiving, via a communication unit of a terminal, at least one of displayable data and soundable data from an external device, wherein the external device includes at least one of a touch-sensitive unit, a first displaying unit and a first speaker, wherein the communication unit connects to the Internet and includes at least one of a cabled communication unit and a wireless communication unit, and wherein the displayable data is displayed on the first displaying unit of the external device, and the soundable data is outputted through the first speaker of the external device, and outputting signals associated with the received at least one of the displayable data and the soundable data to a connectable output unit, wherein the connectable output unit includes at least one of a second speaker and a second displaying unit.

According to an embodiment of the present invention, a device includes a communication unit for connecting the interne, the communication unit including at least one of a cabled communication unit and a wireless communication unit, and a controller cooperating with the communication unit and configured to receive, via the communication unit, at least one of displayable data and soundable data from an external device, process the said at least one of the displayable data and the soundable data, and output, to a connectable output unit, signals resulting from processing the at least one of the displayable data and the soundable data, wherein the external device includes at least one of a touch-sensitive unit, a first displaying unit and a first speaker, wherein the displayable data is displayed on the first display unit and the soundable data is outputted through the first speaker, and wherein the connectable output unit includes at least one of a second speaker and a second displaying unit.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE INVENTION

Reference will now be made in detail to the preferred embodiments of the present invention, examples of which are illustrated in the accompanying drawings.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

Hereinafter, a terminal provided with a networking module according to an embodiment of the present invention will be described in detail with reference to the accompanying drawings.

Figure 1:
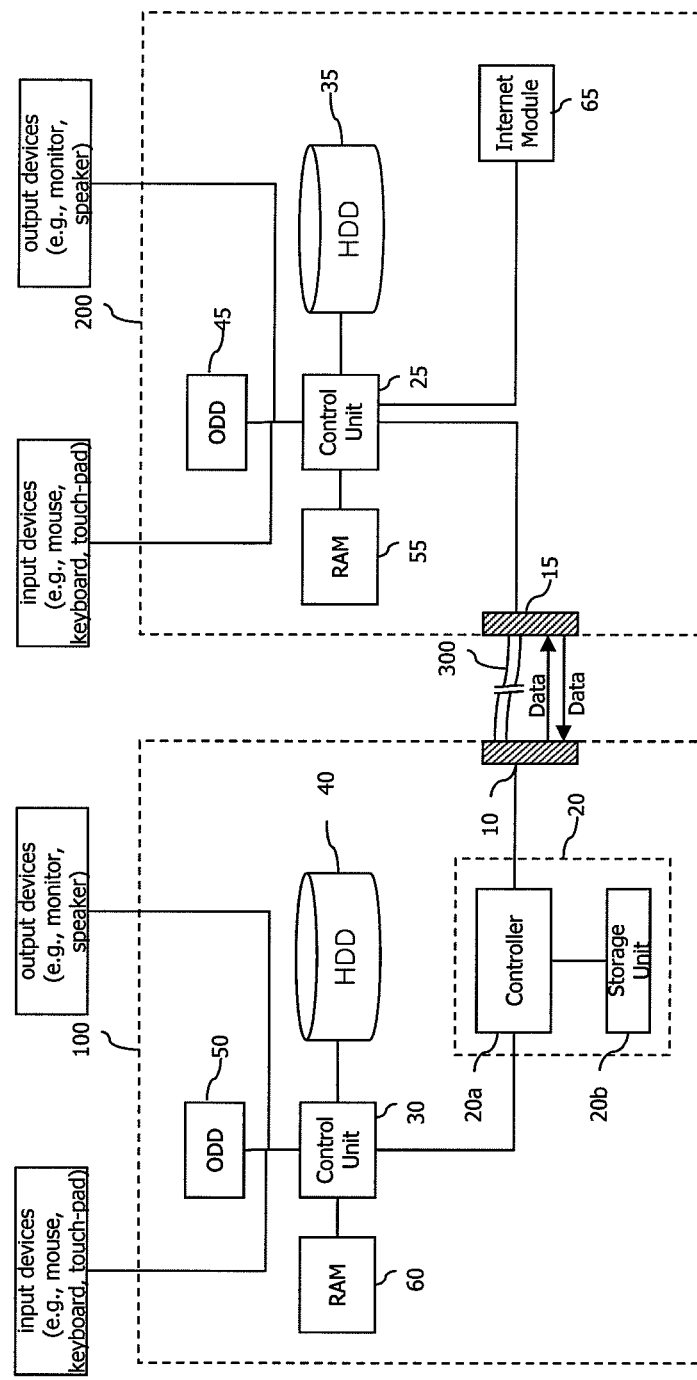
FIG. 1 is a block diagram showing the configuration of a terminal provided with a networking module according to an embodiment of the present invention and a counter terminal connected to the terminal.
Figure 2:
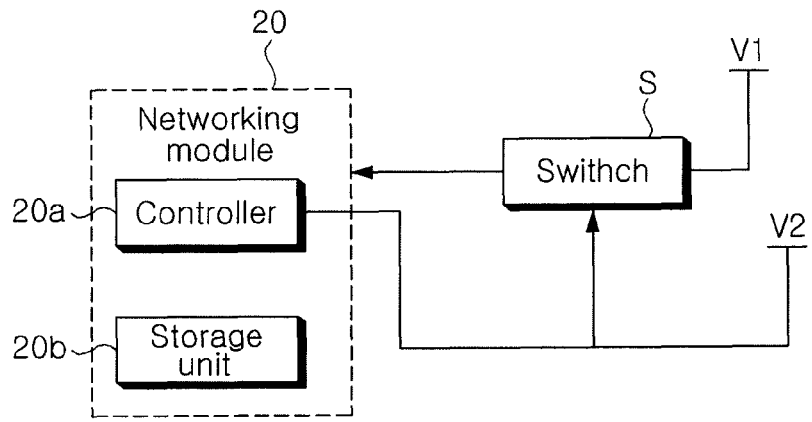
FIG. 2 is a block diagram showing the configuration of power supplier of the networking module according to an embodiment of the present invention.
Figure 3:
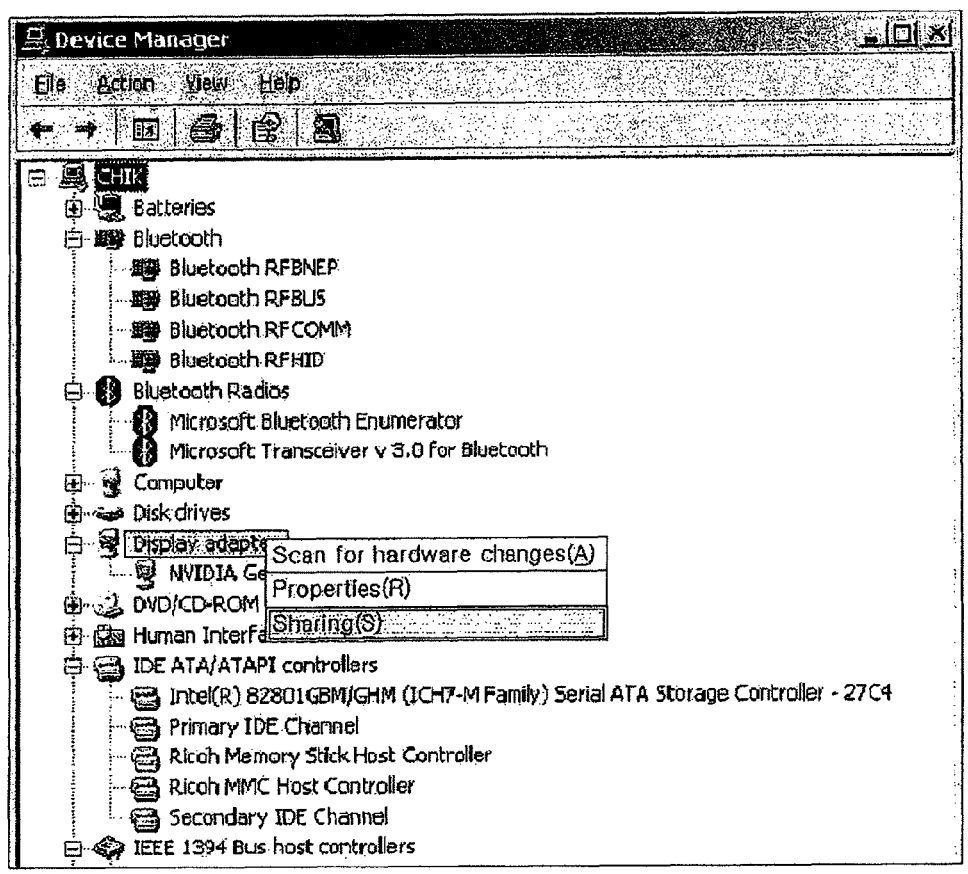
FIG. 3 is an illustration showing a screen for setting data sharing with another terminal according to an embodiment of the present invention.

FIG. 1 is a block diagram showing the configuration of a terminal provided with a networking module according to an embodiment of the present invention and a counter terminal connected to the terminal, FIG. 2 is a block diagram showing the configuration of power supplier of the networking module according to an embodiment of the present invention, and FIG. 3 is an illustration showing a screen for setting data sharing with another terminal according to an embodiment of the present invention.

As shown in FIG. 1, the terminal 100 according to an embodiment of the present invention comprises a connection port 10 for connecting with another terminal. Hereinafter, another terminal connected with the terminal 100 according to an embodiment of the present invention will be referred to as 'a counter terminal 200'.

Here, the terminal 100 is a data processing apparatus such as a desktop computer or a portable computer. And the counter terminal 200 is also one of various data processing apparatuses, or an electronic apparatus including storage devices.

The connection port 10 is a connecting means supporting a communication protocol allowing the terminal 100 to exchange data with another terminal. In particular, the connection port may be an USB (Universal Serial Bus) port broadly used in connection with peripherals.

In addition, a data cable 300 is inserted into the connection port 10 of the terminal 100. One end of the data cable 300 is inserted into the connection port 10 of the terminal 100 and the other end of the data cable 300 is inserted into a connection port 15 of the counter terminal 200, whereby the terminal 100 and the counter terminal 200 is connected physically and electrically.

This is merely an embodiment of the present invention, and the two terminals may be connected without the data cable 300, if a wireless communicating module supporting the same kind of communication protocol is installed on each of the terminal 100 and the counter terminal 200.

For example, in a case where a wireless communicating module supporting a communication protocol such as infrared data communication, Zigbee, Bluetooth, or UWB (Ultra Wide-Band) specification is installed on each of the two terminals, the terminal 100 and the counter terminal 200 can be connected by wireless networking through several steps such as device recognition and selection.

In the meantime, the terminal 100 comprises a networking module 20. The networking module 20 receives and/or transmits data from and/or to the counter terminal 200 connected to the terminal 100 through the data cable 300.

The networking module 20 exchanges data stored in a storage device (including local disk and removable disk) provided in the terminal 100, or stored in a storage area such as a folder or a file of the terminal 100 with data stored in a storage device provided in the counter terminal 200 or in a storage area of the counter terminal 200, according to user settings or commands.

To perform this, the networking module 20 comprises a controller 20a and a storage unit 20b. The controller 20a is a control means to receive and/or transmit data inputting and/or outputting between the terminal 100 and the counter terminal 200 through the data cable 300.

Here, the storage unit 20b is a nonvolatile memory means such as a flash memory, ROM (Read Only Memory), M-RAM (Magnetic Random Access Memory), P-RAM (Phase-change Random Access Memory), and Fe-RAM (Ferroelectric Random Access Memory). The storage unit 20b stores a device driver which is a program routine by which each operating system of the terminal 100 and the counter terminal 200 recognizes the networking module 20 as a device and communicates with the networking module 20.

In addition, the controller 20a installs the device driver stored in the storage unit 20b on both the terminal 100 and the counter terminal 200, if a connection of the data cable 300 connected with the counter terminal 200 into the connection port 10 of the terminal 100 is detected.

Moreover, the storage unit 20b may store an interfacing program as an application program which allows the terminal 100 and the counter terminal to exchange data with each other through the networking module 20.

Also, the controller 20a may install the interfacing program on the two terminals after a connection between the two terminals is detected and the device driver is installed on the two terminals.

On this occasion, the controller 20a may skip installations of the device driver and/or the interfacing program if the device driver and/or the interfacing program are already installed.

In addition, the controller 20a installs the device driver and/or the interfacing program automatically or on command of users.

After installation of the device driver and the interfacing program, the terminal 100 and the counter terminal 200 runs the interfacing program. The interfacing program is also run automatically or on command of users.

The interfacing program is run by a control unit 30 of the terminal 100. The control unit 30 is a control means executing the operating system of the terminal 100. The control unit 30 may be a central processing unit of the terminal 100.

The control unit 30 accesses to the storage unit 20b or loads the interfacing program stored in the storage unit 20b to a RAM 60 and runs the interfacing program. Then, the control unit 30 executes receiving and transmitting data with the counter terminal 200 through the controller 20a.

Meanwhile, in the counter terminal 200, a control unit 25 of the counter terminal 200 runs the interfacing program. The control unit 25 stores the interfacing program in a HDD (Hard disk drive) 35, or a RAM (Random Access Memory) 55 and runs the interfacing program.

Here, the interfacing program is run on the operating systems of the terminal 100 and the counter terminal 200, and at this time, the device driver is used.

The interfacing program provides a user interface for selecting storage devices, storage areas, data transmitting directions, or data transmitting policies (or data-synchronization policies) in order to move data between the terminal 100 and the counter terminal 200.

That is, the terminal 100 may comprise a plurality of storage devices, for example the HDD 40 and an ODD (optical disk drive) 50, as shown in FIG. 1.

Meanwhile, the counter terminal 200 may also comprise a plurality of storage devices, for example the HDD 35 and an ODD 45, as shown in FIG. 1.

The interfacing program may provide lists of storage devices or storage areas of one of the terminal 100 and the counter terminal 200 to the other.

As above, users can select one of storage devices, storage areas such as folders or files, which users desire to transmit, in the user interface provided by the interfacing program.

The interfacing program recognizes a plurality of the storage devices of the terminal 100 and the counter terminal 200, and provides lists of them to the terminal 100 and the counter terminal 200. Then users can select a storage device or a storage area which stores data to be transmitted, and a storage device of a storage area which is to store the data transmitted.

For example, if a user selects the HDD 40 of the terminal 100 and the HDD 35 of the counter terminal 200 through the interfacing program, the networking module 20 receives and transmits the data selected from data stored in the two HDD 35 and 40.

If a user commands to synchronize the ODD 50 of the terminal 100 with a certain folder in the HDD 35 of the counter terminal 200, data in the ODD 50 and data in the folder of the HDD 35 are synchronized.

In the above, the transmitting direction or the synchronization direction may be selected by users through the interfacing program.

That is, users can select a certain data through the interfacing program, and transmit the data between the two terminals 100 and 200 by a selected direction. Here, users can input commands and selections through one of the terminal 100 and the counter terminal 200.

Also, data stored in the terminal 100 can be transmit to the counter terminal 200, and data stored in the counter terminal 200 can be transmit to the terminal 100.

Furthermore, data stored in a storage device or a storage area of the terminal 100 and data stored in a storage device or a storage area of the counter terminal 200 can be synchronized.

That is, if a user commands synchronization between the HDD 40 of the terminal 100 and the HDD 35 of the counter terminal 200 on the user interface provided by the interfacing program, data stored in the HDD 40 of the terminal 100 and data stored in the HDD 35 of the counter terminal 200 become synchronized to each other.

On this occasion, users can select synchronization direction. That is, data of the HDD 35 of the counter terminal 200 is replaced with the data stored in the HDD 40 of the terminal 100 or data of the HDD 40 of the terminal 100 is replaced with the data stored in the HDD 35 of the counter terminal 200.

Also, data stored in the HDD 35 of the counter terminal 200 but not stored in the HDD 40 of the terminal 100 may be moved to the HDD 40 of the terminal 100. Likewise, data stored in the HDD 40 of the counter terminal 100 but not stored in the HDD 35 of the terminal 200 may be moved to the HDD 35 of the terminal 200.

In addition, as described above, users can select storage devices or storage areas for data-synchronization through the user interface provided by the interfacing program.

That is, users may select a folder from each of the two terminals 100 and 200, and synchronize the selected two folders.

In detail, first of all, storage devices and storage areas of the terminal 100 are displayed in the terminal 100 in order for users to select storage devices and storage areas to be permitted to share. Then users may select at least one storage device or area in which data is permitted to share.

After then, a list of the selected storage devices or areas is displayed on the counter terminal 200.

Likewise, in the counter terminal 200, storage devices and storage areas of the counter terminal 200 are displayed in the terminal 200 in order for users to select storage devices and storage areas permitted to be shared. Then users may select at least one storage device or area in which data is permitted to be shared.

A list of the selected storage devices or areas of the counter terminal 200 is displayed on the terminal 100.

Here, the interfacing program allows users to set a receiving and transmitting level on each of the storage devices and areas selected to be shared.

That is, in a case where a user selects a certain folder of the terminal 100 and permits to share data in the selected folder with the counter terminal 200, it may be selected whether the data in the folder can be only read or can be both read and edited through the counter terminal 200.

Likewise, in a case where data stored in the ODD 45 of the counter terminal 200 is permitted to be shared with the terminal 100, users can set the data in the ODD 45 to be able to only be displayed on the terminal 100.

In this case, in permitting to transmit data in the terminal 100 or the counter terminal 200, a process to certify an authority to allow data transmitting may be done.

For example, the interfacing program requires users to input a password in the process to allowing data receiving or transmitting. And only when a password inputted corresponds to a predetermined password, data is transmitted.

Meanwhile, on the list of the storage devices and areas of the counter terminal 200, permitted to be share data with the terminal 100, wherein the list is displayed on the terminal 100, users can select at least one of the storage devices and areas to which data stored in the terminal 100 is transmitted, or from which data transmitted to the terminal 100.

For example, if it is tried to transmit data stored in the terminal 100 to a folder of the counter terminal 200, a name or an icon of a file or a folder to be transmitted is selected and dragged-and-dropt to one of names or icons representing storage devices or areas of the counter terminal 200 in the terminal 100, whereby the file or the folder is transmitted to a storage device or area of the counter terminal 200.

Furthermore, if a user selects data to be transmitted to the counter terminal 200 in the terminal 100 and commends to transmit, the interfacing program provides user interface for selecting one of storage devices or areas of the counter terminal 200 permitted to be shared, to the terminal 100 and then a user selects one of storage devices or areas so that the data selected to be transmitted is transmitted to the one of storage devices or areas of the counter terminal 200.

Likewise, if a user selects data to be transmitted to the terminal 100 in the counter terminal 200 and commends to transmit, the interfacing program provides user interface for selecting one of storage devices or areas of the terminal 00 permitted to be shared, to the counter terminal 200 and then a user selects one of storage devices or areas so that the data selected to be transmitted is transmitted to the one of storage devices or areas of the terminal 100.

Also, in the terminal 100 or the counter terminal 200, users can choose a storage device or area of the terminal 100 and a storage device or area of the counter terminal 200, and then command to synchronize data of the two selected storage devices or areas.

For the purpose of making it easier to select storage devices or areas and to transmit or synchronize data, the terminal 100 and the counter terminal 200 may access to storage areas of each other through Window explorer (or window browser) on the operation system based on Window of Microsoft and read or write data of the storage areas.

To transmit or synchronize data, each of control units 30 and 25 of the terminal 100 and the counter terminal 200 runs the interfacing program and then the control unit 30 of the terminal 100 allows the controller 20a of the networking module 20 to input and/or output data. After then, the controller 20a moves data through the data cable 300.

The interfacing program displays the progress and the completion of data transmission through each display unit of each of the two terminals 100 and 200 while moving data between the two terminals.

Then, if the terminal 100 and the counter terminal 200 are disconnected from each other, the interfacing program run by the counter terminal 200 may uninstall itself and the device driver.

That is, if the data cable 300 is disconnected from the connection port 10 or 15, the control unit 25 of the counter terminal 200 detects this and then uninstalls the interfacing program and the device driver.

Here, the uninstallation is performed by an uninstall program included in the interfacing program.

However, in a case where the terminal 100 and the counter terminal 200 are connected to each other by wireless way, the communication between the terminal 100 and the counter terminal 200 is disconnected by a disconnecting condition such as a user command, the passage of time and the completion of data transmission and the terminal 100 and the counter terminal 200 detect this.

In addition, if the counter terminal 200 is also a terminal provided with a networking module, such as the terminal 100 according to the present invention, the uninstallation process may be skipped.

Further, the interfacing program and the device driver for the networking module may be uninstalled also in the terminal 100, wherein the interfacing program and the device driver are uninstalled only on the RAM 60 and the HDD 40, not on the storage unit 20b of the networking module.

In the meantime, the terminal 100 according to an embodiment of the present invention is connected to Internet through an Internet module 65 of the counter terminal 200.

A function to change the Internet sharing environment of the terminal 100 and the counter terminal 200 is provided by a program included in the interfacing program or another program.

That is, the interfacing program or the another program is automatically installed and run on the terminal 100 and the counter terminal 200 when connection between the terminal 100 and the counter terminal 200 is detected and changes the Internet sharing environment.

The values changed will be described in detail later on with reference to FIG. 6.

If values of the Internet sharing environment are changed, the terminal 100 can be connected to the Internet through the Internet module 65 of the counter terminal 200.

Meanwhile, each control unit 30 or 25 of the terminal 100 and the counter terminal 200 blocks the terminal 100 or the counter terminal 200 to enter a power saving mode through the operating system when connection between the terminal 100 and the counter terminal 200 is detected.

Since power must be supplied to storage devices such as the HDDs 40 and 35 and the ODDs 50 and 45 in order to transmit data between the terminal 100 and the counter terminal 200, the terminal 100 and the counter terminal 200 are prevented from entering the power saving mode while transmitting data.

If the terminal 100 and the counter terminal 200 are in the power saving mode when the terminal 100 and the counter terminal 200 are connected to each other, the terminal 100 and the counter terminal 200 are resumed from the power saving mode.

In another embodiment of the present invention, the terminal 100 and the counter terminal can share hardwares of each other, if the terminal 100 and the counter terminal 200 are connected to each other.

This may be achieved by transmitting data to be input/output to/from hardwares through the networking module provided in the terminal 100.

For example, if one of input devices of the terminal 100, such as a mouse, a keyboard or a touch-pad, is permitted to be shared with the counter terminal 200, signals input by the one of the input devices are transmitted to the counter terminal 200 through the networking module, so that the one of the input devices of the terminal 100 may be used as an input device for the counter terminal 200.

In this case, the signals input by one of the input devices may be transmitted to both of the control units 30 and 25 of the two terminals 100 and 200, and processed by the both of the control units 30 and 25.

But if one of input devices of the terminal 100 is permitted to be used as an input device only for the counter terminal 200, signals input by the one of the input devices may be transmitted only to the counter terminal 200.

Here, users may select whether to permit sharing one of the input devices of the terminal 100 with the counter terminal 200 on the user interface provided by the interfacing program or on a user interface basically provided by the operating system of the terminal 100.

In addition, in a case where one of the input devices of 100 is permitted to be shared with 200, as above, a user interface to stop sharing the one of the input devices may be provided in the counter terminal 200.

The user interface to stop sharing the input device may be provided by the interfacing program or by the operating system of the counter terminal 200.

If an input device of the terminal 100 is permitted to be shared with the counter terminal 200, the control unit 25 of the counter terminal 200 detects this and provides the interface to stop sharing. When a user commands to stop sharing through the interface to stop sharing the input device, signals input by the input device are no longer transmitted to the counter terminal 200. Then, the signals input by the input device are processed in the terminal 100.

These can be applicable in a case of permitting an input device of the counter terminal 200 to be shared with the terminal 100.

As described above, in a case where an input device of one of the two terminals 100 and 200 is permitted to be shared with the other, signals from the input device may be transmitted to the other through the networking module 20, so that the two terminals 100 and 200 can share their input devices.

As another example, if an output device such as a monitor or a speaker of the counter terminal 200 is permitted to be shared with the terminal 100, signals to be output by the output device are transmitted from the terminal 100 to the counter terminal 200 through the networking module 20, so that the output device of the counter terminal 200 may be used as an output device for the terminal 100.

Here, the same signals can be output by both the terminal 100 and the counter terminal 200. To allow an output device of the counter terminal 200 to be shared with the terminal 100, the interfacing program being run on the counter terminal 200 may provide a user interface by which users can select whether to permit an output device to be shared.

Also, the operating system of the counter terminal 200 may provide a user interface providing the same function.

For example, as shown in FIG. 3, in the device manager basically provided in the operating system to set hardware variables, a shortcut menu shown up when a monitor icon is right-clicked includes a sharing item, and a monitor corresponding to the monitor icon may be shared with another terminal by clicking on the sharing item.

Furthermore, as described above, if an output device of the counter terminal 200 is permitted to be shared with the terminal 100, a user interface to stop sharing the output device is provided in the terminal 100.

The user interface to stop sharing the output device is provided by the interfacing program being run on the terminal 100 or by the operating system of the terminal 100.

When the output device is stopped from being shared, signals generated by the counter terminal 200 are displayed on the output device.

In the meantime, a power supplier of the networking module of the terminal 100 according to an embodiment of the present invention, as shown in FIG. 1 includes a switch S connected across a power line through which internal power (voltage V1) is provided to the terminal 100.

The internal power (voltage V1) source may be a battery or a regulator or an adapter converting external AC power to DC power according to a kind of the terminal and to power supplying states.

The switch may be a circuit element or device being able to control electric current based on control signals, such as a BJT (Bipolar Junction Transistor) or a FET (Field Effect Transistor).

The internal power (voltage V1) is supplied to every element of the terminal 100 and also to the networking module 20. However, in a state where the terminal 100 is not connected to another terminal, such as the counter terminal 200, the switch S is opened, so that the internal power may be not supplied to the networking module 20 in order to reduce power consumption.

If a control signal is applied on the switch S, in other words, if an external power (voltage V2) is supplied to the switch S from the counter terminal 200 through the data cable 300, the switch S is shorted, so that the internal power (voltage V1) is supplied to the networking module 20. Accordingly, the networking module 20 is activated, and then data transmission can be done.

Meanwhile, the external power (voltage V2) is applied on some pins of a chip included in the controller 20a, so that the controller 20a may detect whether the external power is input to the terminal 100.

After then, the counter terminal 200 is connected to the terminal 100 and the internal power is provided to the networking module 20. Thus the controller 20a detects the external power (voltage V2) and then installs the interfacing program and the device driver as described above.

Moreover, the control unit 30 of the terminal 100 may detects the external power supplied from the counter terminal 200 through the data cable 300, and the control unit 25 of the counter terminal 200 may detects power supplied from the terminal 100 through the data cable 300, so that both of the control units 30 and 25 can detect connection and disconnection of each other.

In this case, each control unit 30 or 25 of the two terminals 100 and 200 runs the uninstall program included in the interfacing program so that the interfacing program and the device driver may be uninstalled, if the data cable 300 is disconnected.

Whereas, even if the disconnection between the terminal 100 and the counter terminal 200 is detected, the control unit 30 of the terminal 100 may not run uninstall program not to uninstall the interfacing program and the device driver, in order to prevent the terminal 100 from repetitively re-installing the interfacing program and the device driver. In addition, if the counter terminal 200 is a terminal provided with the networking module 20 according to an embodiment of the present invention, such as the terminal 100, the control unit 25 of the counter terminal 200 may also not run the uninstall program.

Hereinafter, a method for receiving and transmitting data according to an embodiment of the present invention will be described in detail with reference to the accompanying drawings.

Figure 4:
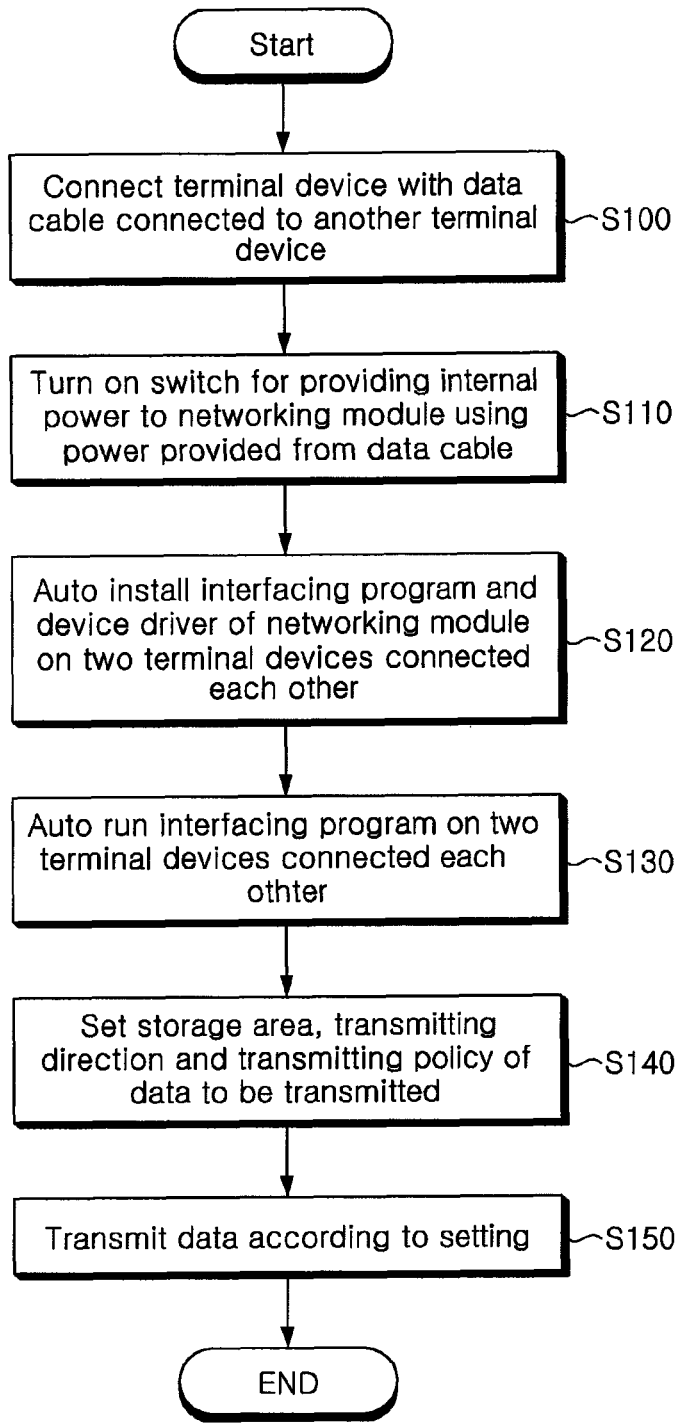
FIG. 4 is a flow chart showing a process of receiving and transmitting data between two terminals according to an embodiment of the present invention.
Figure 5:
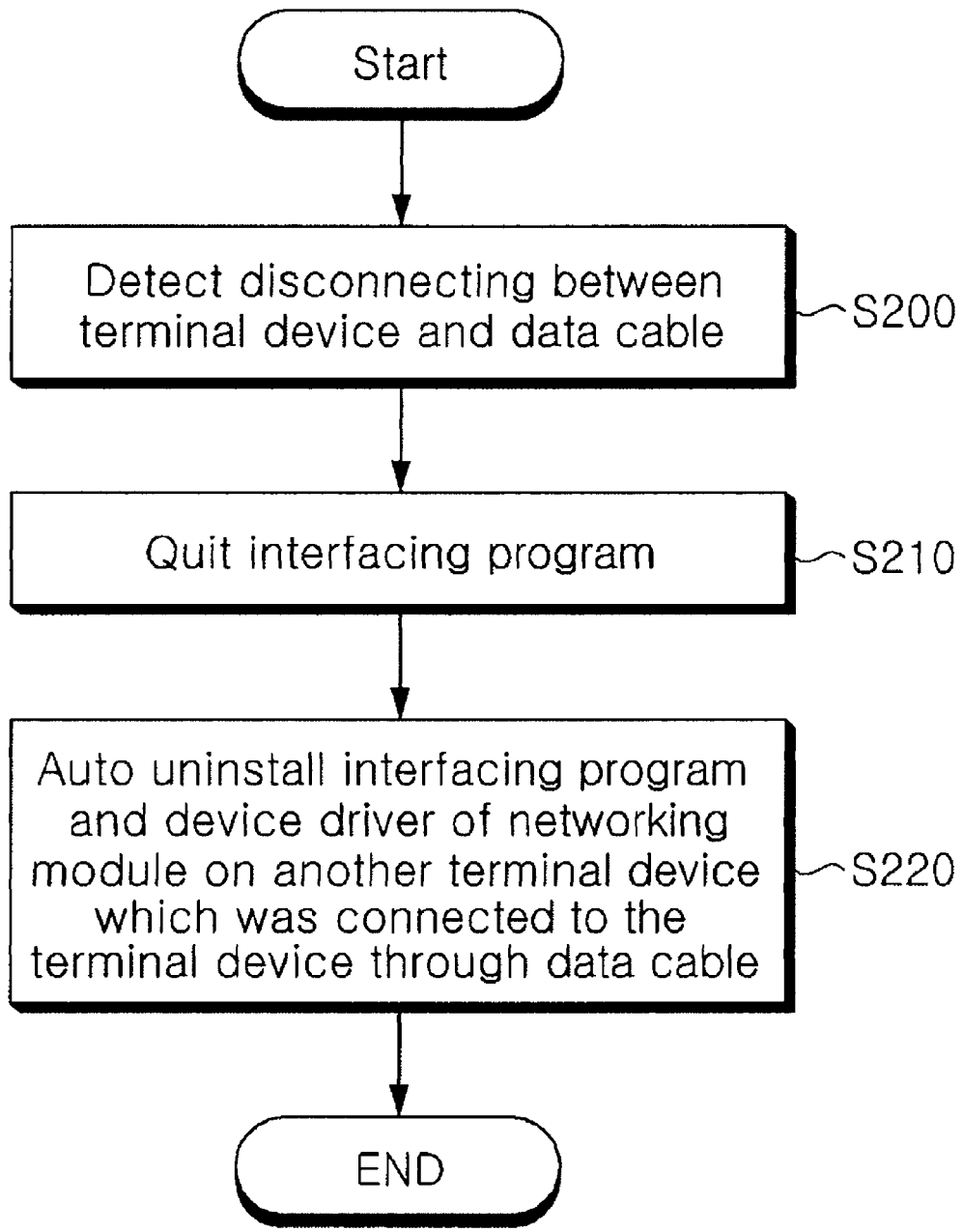
FIG. 5 is a flow chart showing a process of receiving and transmitting data between two terminals according to another embodiment of the present invention.
Figure 6:
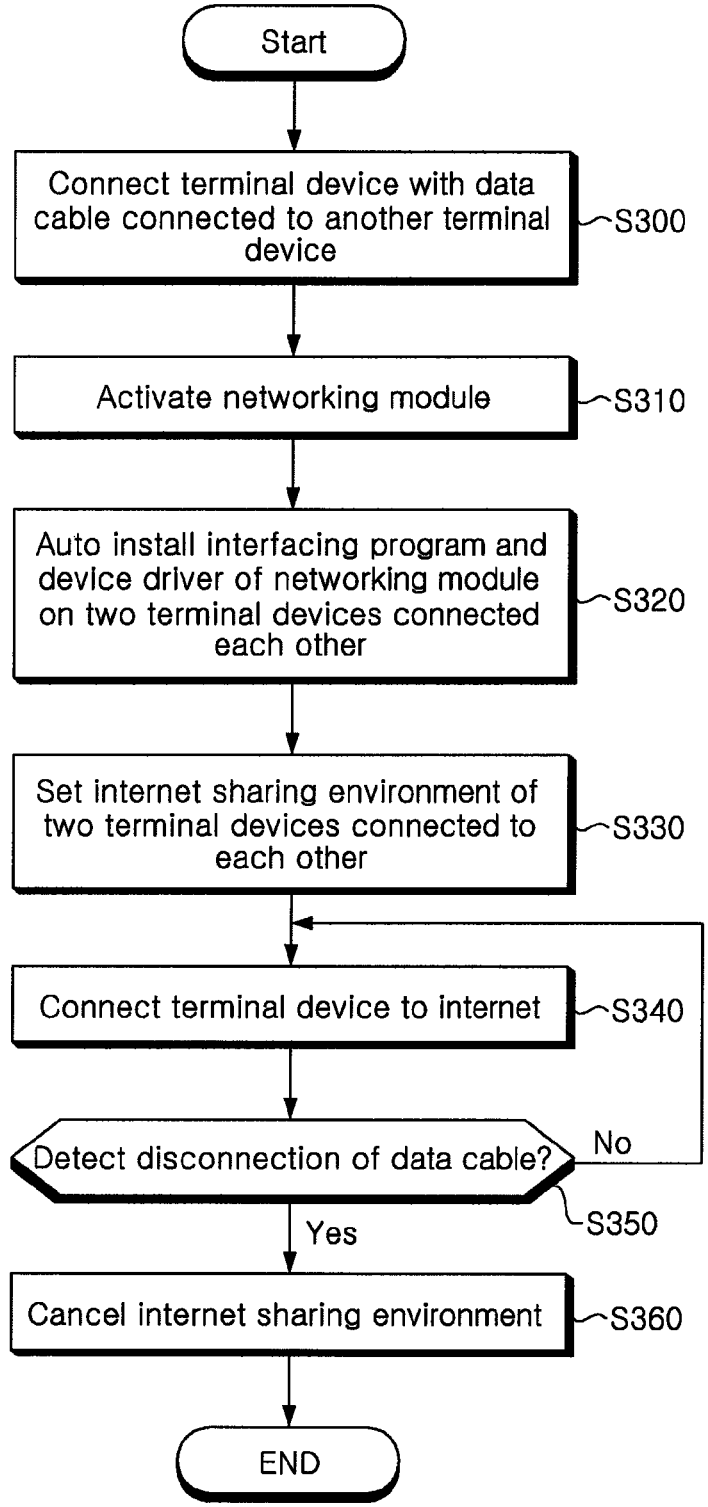
FIG. 6 is a flow chart showing a process of receiving and transmitting data between two terminals according to another embodiment of the present invention.

FIG. 4 is a flow chart showing a process of receiving and transmitting data between two terminals according to an embodiment of the present invention, FIG. 5 is a flow chart showing a process of receiving and transmitting data between two terminals according to another embodiment of the present invention, and FIG. 6 is a flow chart showing a process of receiving and transmitting data between two terminals according to another embodiment of the present invention.

As shown in FIG. 4, the method for receiving and transmitting data according to an embodiment of the present invention starts with a step of connecting the terminal 100 and the data cable 300 connected to another terminal (hereinafter, a counter terminal 200) (S100).

In the step 100 (S100), the control unit 30 of the terminal 100 and the controller 20a of the networking module 20 detect power provided through the data cable 300.

Here, if each of the terminal 100 and the counter terminal 200 includes a wireless communicating module supporting the same wireless communication protocol, the step 100 may comprise a step of activating each of the wireless communicating module of the terminal 100 and the counter terminal 200 and a step of connecting the each wireless communicating module to a wireless network. Moreover, the step 100 may comprise a step in which the terminal 100 recognizes the counter terminal 200 connected to the terminal 100 through the wireless network, and a step certifying an authority to connect the terminal 100 to another terminal.

Then, the switch S connected across the power line through which the internal power is supplied to the networking module 20 is turned on by the external power (voltage V2) supplied from the counter terminal 200 through the data cable 300, thus the internal power in supplied to the networking module 20 (S110).

The networking module 20, however, is not necessarily activated by the above way. The terminal 100 may supply just standby power to the networking module 20 usually, and supply driving power to the networking module 20 when connection with another terminal is being detected.

In the step 110 (S110), if the networking module 20 is activated, the controller 20a provided in the networking module 20 installs the interfacing program and the device driver stored in the storage unit 20b on the terminal 100 and the counter terminal 200 (S120).

At this time, the controller 20a may install the interfacing program and the device driver automatically or on user command. In addition, the step 120 (S120) may include a step of asking whether to install the interfacing program and the device driver.

Here, if the interfacing program and the device driver have already installed in the terminal 100 and the counter terminal 200, the step 120 can be skipped.

Then, if the installation of the interfacing program and the device driver is completed in the step 120, the control units 30 and 25 of the terminal 100 and the counter terminal 200 run the interfacing program using the operating system (S130). Also, users can command to run the interfacing program.

The interfacing program run in the step 130 (S130) may provide a user interface in order to make it easier to transmit data. The user interface provided by the interfacing program allows users to select storage areas of the terminal 100, storage areas of the counter terminal 200, data-transmitting directions and data-transmitting policies regarding data to be transmitted (S140).

In the user interface, a list of storage devices and areas of the terminal 100 is provided, so that users can select one of the storage devices and areas on the list. In addition, in the user interface provided in the counter terminal 200, a list of storage devices and areas of the counter terminal 200 is provided, so that users can choose one of the storage devices and areas on the list.

Here, the selected storage devices and areas of one of the two terminals 100 and 200 are permitted to be shared with the other. A list of the selected storage devices and areas of the terminal 100 is displayed on the counter terminal 200, and a list of the selected storage devices and areas of the counter terminal 200 is displayed on the terminal 100.

Accordingly, users may select on the terminal 100 a storage device or area of the counter terminal 200 in which data desired to be transferred to the terminal 100 is stored, and then select on the terminal 100 a storage device or area of the terminal 100 in which data transmitted from the counter terminal 200 is to be stored. Then users may input a data transmission, exchange or synchronization command.

According to the input command, data desired to be transferred is transferred from the counter terminal 200 to the terminal 100 (S150).

Likewise, if users want data to be transmitted from the terminal 100 to the counter terminal 200, users may select on the counter terminal 200 a storage device or area of the terminal 100 in which data desired to be transferred to the counter terminal 200 is stored, and then input a data transmission command.

Accordingly, the data desired to be transferred to the counter terminal 200 is transferred (S150).

In the step 140 (S140), the data transmitting direction which may be selected on the user interface provided by the interfacing program represents whether to transmit data from the terminal 100 to the counter terminal 200 or from the counter terminal 200 to the terminal 100.

The data transmitting policy represents whether to transmit data selected to be transmitted, or synchronize two storage areas of the terminal 100 and the counter terminal 200. If data in a storage area of the terminal 100 and data in a storage area of the counter terminal 200 is synchronized, the transmitting policy comprises on which one of the two storage areas the synchronization bases.

In the step 150 (S150), the control unit 30 of the terminal 100 and the control unit of the counter terminal 200 communicates through the networking module 20, and the networking module 20 controls input/output of data between the terminal 100 and the counter terminal 200.

In the meantime, as shown in FIG. 5, a method for receiving and transmitting data according to another embodiment of the present invention starts with detecting disconnection between the terminal and the data cable 300 connected with another terminal, for example the counter terminal 200 (S200).

The step 200 (S200) is conducted by detecting physical disconnection between the connection port 10 and the data cable 300 or discontinuance of power supply through the data cable 300.

In a case where the terminal 100 and the counter terminal 200 are connected by wireless way, the step 200 is conducted by detecting disconnection of wireless communication. Then, if the disconnection between the terminal 100 and the counter terminal 200 is detected, each of the control units 30 and 25 quits the interfacing program (S210).

After then, the interfacing program and the device driver installed on the counter terminal 200 are uninstalled (S220).

The step 220 (S220) is conducted by the uninstall program which is automatically run at the same time with detecting disconnection.

Likewise, the interfacing program and the device driver installed on the terminal 100 may be also uninstalled. But if the counter terminal 200 also has the networking module 20, the interfacing program and the device driver installed on the counter terminal 200 may not be uninstalled.

Meanwhile, as shown in FIG. 6, a method for receiving and transmitting data according to another embodiment of the present invention provides a way how the terminal 100 is connected to Internet through the Internet module 65 of the counter terminal 200, in a case where the terminal 100 can't be connected to Internet, but the counter terminal can.

The method stats with connecting the terminal 100 and the counter terminal 200 through the data cable 300 (S300).

In the step 300 (S300), if connection between the terminal 100 and the counter terminal 200, the networking module is activated (S310).

The connection between the terminal 100 and the counter terminal 200 may be detected in various ways, for example as described above, by detecting power supply from the data cable 300.

The activation of the networking module 20 means that the networking module 20 starts to be supplied with driving power, in a state where being supplied only with standby power or where being off.

After the networking module 20 is activated in the step 310 (S310), the controller 20a installs the interfacing program and the device driver stored in the storage unit 20b on the terminal 100 and the counter terminal 200 (S320). Here, if the interfacing program and the device driver are already installed, the step 320 (S320) may be skipped.

The controller 20a of the networking module may set Internet sharing environment of the terminal 100 and the counter terminal 200 (S330).

In the operating system based on Window of Microsoft, Internet sharing is supported. The controller 20a intermediates communication between the control unit 30 of the terminal 100 and the control unit 25 of the counter terminal 200 by the installed device driver, and permits each of the control unit 30 or 25 to change Internet sharing environment of the terminal 100 and the counter terminal 200.

A program for changing the Internet sharing environment may be included in the interfacing program or be stored as separate program in the storage unit 20b.

In the counter terminal 200, the step 330 (S330) is conducted by setting the Internet protocol address of the counter terminal 200, a sub-network mask value and a domain name server address.

Likewise, in the terminal 100, the step 330 is conducted by setting the Internet protocol address of the terminal 100, a sub-network mask value and a gateway address.

Here, the Internet protocol address, the sub-network mask value and the gateway address are set to predetermined values.

The Internet protocol address set on the counter terminal 200 and the Internet protocol address set on the terminal 100 are determined to be related to each other. The sub-network mask values set on the terminal 100 and the counter terminal 200 are determined as the same value. The gateway address set on the terminal 100 is predetermined as the Internet protocol address of the counter terminal 200.

Meanwhile, the domain name server address may be predetermined as described above, or be changed and reset by users. Here a user interface may be provided to permit users to change or reset the domain name server address.

If the Internet sharing environments are set on each of the terminal 100 and the counter terminal 200 in the step 300 (S330), the terminal 100 may be connected to Internet through the Internet module 65 of the counter terminal 200. Accordingly, Internet service can be provided for users of the terminal 100.

In the meantime, if the terminal 100 and the counter terminal 200 are disconnected from each other (S350), each of the control units 30 and 25 of the terminals 100 and 200 may reset the Internet sharing environment (S360).

The scope of the present invention is not limited to the embodiments described above but is defined by the appended claims. It will be apparent that those skilled in the art can make various modifications and changes thereto within the scope of the invention defined by the claims.

What is claimed is:

1. A method for receiving data, the method performed by a device and comprising:
    receiving, via a communication unit of the device, at least one of displayable data and audible data from a counter terminal,
    wherein the communication unit includes at least one of a short-range cable communication unit and a short-range wireless communication unit and is configured to connect to an internet,
    wherein the device and the counter terminal belong to a same network,
    wherein the device further includes a cable connector configured to support a universal serial bus (USB),
    wherein the counter terminal includes at least one of a touch pad, a storage unit for storing the at least one of the displayable data and the audible data, a counter terminal displaying unit for displaying the stored displayable data and a counter terminal speaker for outputting the stored audible data, and
    wherein, before receiving the at least one of the displayable data and the audible data, the at least one of the displayable data and the audible data has been stored in the counter terminal and then the counter terminal receives a request for transmitting the at least one of the displayable data and the audible data in a state where the at least one of the displayable data and the audible data is outputted by the counter terminal displaying unit and the counter terminal speaker, respectively; and
    outputting signals associated with the received at least one of displayable data and audible data to a connectable output unit,
    wherein the connectable output unit includes at least one of a speaker and a displaying unit.

2. The method of claim 1, further comprising:
    outputting a signal other than the signals to the connectable output unit if the at least one of the displayable data and the audible data is not received from the counter terminal.

3. The method of claim 1, wherein the device or the counter terminal provides an interface for receiving an input to stop the connectable output unit from outputting the signals.

4. The method of claim 3, wherein the input to stop outputting the signals is received from a peripheral input unit.

5. The method of claim 1, wherein a progress is displayed on the displaying unit of the counter terminal, is associated with the at least one of the displayable data and the audible data that are being received and outputted, and is transmitted to the displaying unit of the connectable output unit.

6. The method of claim 1, wherein a user interface associated with running an operating system is displayed on the displaying unit of the connectable output unit.

7. The method of claim 6, further comprising:
    outputting signals associated with the user interface to the displaying unit of the connectable output unit.

8. The method of claim 6, wherein a drag and drop input to reproduce the received at least one of the displayable data and the audible data is received on the user interface.

9. The method of claim 6, wherein the user interface provides an environment for setting the Internet.

10. The method of claim 9, wherein the environment allows an internet address to be set.

11. The method of claim 1, further comprising:
    recognizing the counter terminal to which the at least one of the displayable data and the audible data is transmitted.

12. The method of claim 1, further comprising:
    transmitting, via the communication unit, a particular input to the counter terminal upon receiving the particular input from an input device associated with the device.

13. The method of claim 1, wherein when the at least one of the displayable data and the audible data is received, the received at least one of the displayable data and the audible data is temporally stored in a storage unit of the device.

14. The method of claim 1, further comprising:
    detecting a connection between the device and the counter terminal; and
    controlling the device and the counter terminal not to enter a power saving mode when the connection is detected.

15. A device, comprising:
    a cable connector configured to support a universal serial bus (USB);
    a communication unit configured to connect to the internet, the communication unit including at least one of a short-range cable communication unit and a wireless communication unit; and
    a controller cooperating with the communication unit and configured to receive, via the communication unit, at least one of displayable data and audible data from a counter terminal, and process the received at least one of the displayable data and the audible data,
    wherein the device and the counter terminal belong to a same network,
    wherein the counter terminal includes at least one of a touch pad, a storage unit for storing the at least one of the displayable data and the audible data, a counter terminal displaying unit for displaying the stored displayable data and a counter terminal speaker for outputting the stored audible data, respectively, and
    wherein, before receiving the at least one of the displayable data and the audible data, the at least one of the displayable data and the audible data has been stored in the counter terminal and then the counter terminal receives a request for transmitting the at least one of the displayable data and the audible data in a state where the at least one of the displayable data and the audible data is outputted by the counter terminal displaying unit and the counter terminal speaker, respectively,
    wherein the controller is further configured to output, to a connectable output unit, signals resulting from processing the at least one of the displayable data and the audible data, and
    wherein the connectable output unit includes at least one of a second speaker and a second displaying unit.

16. The method of claim 1, further comprising:
    changing from a power saving mode to a wakeup mode when the device is in the power saving mode before receiving the at least one of the displayable data and the audible data from the counter terminal.

\* \* \* \* \*